Patented Mar. 17, 1936

2,034,665

UNITED STATES PATENT OFFICE 2,034,665

METHOD FOR THE PRODUCTION OF SULPHUR-CONTAINING TERPENE COMPOUNDS

Emil Ott, Elsmere, Del., assignor to Hercules Powder Company, Wilmington, Del., a corporation of Delaware No Drawing. Application June 7, 1935, Serial No. 25,427

17 Claims. (Cl. 260—17)

This invention relates to the production of sulphur-containing terpene products, and more particularly to the production of such products from halogenated terpene compounds.

In application Serial No. 713,304, filed February 28, 1934, by me jointly with Joseph N. Borglin, there is disclosed a method for the production of sulphur-containing terpene compounds involving the direct addition of hydrogen sulphide to unsaturated terpene compounds. By such methods, however, it is not possible to produce sulphur-containing terpene compounds from saturated terpene compounds, nor can certain types of sulphur-containing terpene compounds be produced.

Now in accordance with this invention a halogenated terpene compound, as a fluorine, chlorine, bromine or iodine addition or substitution product of a terpene compound, as, for example, a terpene hydrocarbon, as pinene, dipentene, terpinene, terpinolene, paramenthene, etc., a terpene alcohol, as borneol, fenchyl alcohol terpineol, etc., a terpene ketone, as camphor, fenchone, etc., a terpene acid, as fencholic acid, etc., a terpene sulphur compound, etc., is reacted with an organic or inorganic compound containing the group -S$_n$M, where M is a metal, the ammonium group or hydrogen, and $n$ is 1 or more.

Halogen addition or substitution products of terpene compounds are all well known and are usually prepared by direct treatment of the desired terpene compound with the halogen or with a hydrogen halide. Chlorine and bromine are the halogens usually employed. They may also be produced by the use of sulphur halides, acid halides, etc.

Any compound containing the group -S$_n$M, as above defined, may be employed in the method in accordance with this invention, as, for example, hydrogen sulphide; metal hydrosulphides, as sodium, potassium hydrosulphides, etc.; metal sulphides, as sodium potassium, calcium, barium sulphides, etc.; metal polysulphides, a sodium polysulphide, metal thiocyanates, etc.; organic compounds containing the -SH group, as, for example, mercaptans, as ethyl, benzyl, pinene mercaptans, thiophenol, mercapto-abietic acid, etc.; thioacids; xanthates; trithiocarbonates; etc.; organic compounds containing the -SM group, where M is a metal, as, for example, mercaptides, as sodium amyl mercaptide, potassium thiophenolate, sodium dipentene mercaptide, etc.

The halogenated terpene compound and the sulphur compound of the type described may be reacted in any proportion, depending on the molecular composition of the products to be reacted and the product desired, and also on the relative cost of reagents, altho where optimum reaction rates and yields are desired, a ratio of from about 1 part to about 5 parts by weight of sulphur compound per part of halogenated terpene compound is to be preferred. The reaction will preferably be carried out at an elevated temperature in order to secure a practical reaction rate, however, the reaction occurs at a temperature of from about 0° C. up to the decomposition temperature of the reactants. A temperature of from about 60° C. to about 110° C. is very satisfactory. Pressure conditions have slight effect upon the reaction, except where hydrogen sulphide is employed, in which case super-atmospheric pressure may be employed to advantage.

The sulphur compound, if solid, will preferably be dissolved in an organic solvent therefor, as for example, ethyl alcohol, methyl alcohol, acetone, etc., or even in water, or in mixtures of such solvents, depending on its solubility. The halogenated terpene compounds, if liquids, will ordinarily be used in such form in the reaction, and the solvent selected for the sulphur compound will preferably be miscible with the halogenated terpene compound. If the halogenated terpene compound is solid, it will desirably be dissolved, either in the same solvent as that used for the sulphur compound or in a solvent miscible with such solvent. When the sulphur compound employed is hydrogen sulfide, the hydrogen sulphide will desirably be bubbled through the halogenated terpene compound, which if not a liquid, will be in solution.

After the completion of the reaction, which will usually take from about ¼ to about 30 hours, depending upon the particular conditions of reaction employed, the sulphur-containing terpene compound may be recovered from the reaction mixture, for example, by extracting the latter, preferably after acidification, with a solvent for the reaction product which is a non-solvent for the unreacted sulphur compound and the like impurities, as, for example, with carbon tetrachloride, benzene, gasoline, etc., or by a variety of other methods, obvious to those skilled in the art, depending on the chemical and physical nature of the particular reaction mixture. A preliminary extraction of the non-acidified reaction mixture will remove most of the unreacted halogenated terpene compound, together with some partially sulphurized material. The separated sulphur-containing terpene product may, in most instances, be further refined by suitable procedure, as distillation, preferably in vacuo, extraction, etc.

Diverse types of sulphur-containing terpene compounds may be produced in accordance with this invention. Thus, for example, and depending upon the type of sulphur compound employed, terpene mercaptans or thioalcohols; terpene sulphides or thioethers; mixed terpene and alkyl, aryl or aralkyl thioethers; terpene di- or polysulphides; terpene thioacids or derivatives thereof; etc.; may be formed.

If desired, the halogenated terpene compound may be admixed with other organic halogen compounds, and the resultant mixture treated with a sulphur compound of the type described in accordance with this invention.

When hydrogen sulphide is to be used as the sulphur compound in accordance with this invention, it is not necessary to first halogenate a terpene compound and then react the halogenated compound with the hydrogen sulphide. If desired, the two reactions may proceed simultaneously. Thus, a terpene compound may be treated in accordance with this invention simultaneously with a halogen and with hydrogen sulphide.

The following examples are illustrative of practical procedure in accordance with this invention:

Example I 25 g. chlorinated dipentene (35.8% $Cl_2$) were refluxed 17 hours with 50.0 g. sodium polysulphide in ethyl alcohol solution. The reaction mixture was diluted with water and extracted with carbon tetrachloride, and the extract was separated and evaporated. The product analyzed:

S _____ 9.6%
$Cl_2$ _____ 8.6%

The once extracted aqueous layer was acidified with acetic acid and again extracted with carbon tetrachloride. The extract was then water washed and evaporated. The product analyzed:

$Cl_2$ _____ 1.4%
S _____ 40%

Example II

An excess of potassium hydrosulphide in alcohol was added to chlorinated alpha-terpinene which contained 31% $Cl_2$. These reactants were refluxed two hours, cooled and water washed. The resulting oil gave a positive doctor test for mercaptan and analyzed:

S _____ 5.5%
$Cl_2$ _____ 13.4%

Example III

Chlorinated pinene was refluxed eight hours with an excess of alcoholic solution of sodium amyl mercaptide. Benzene was added to the reaction product, which was then diluted with water, acidified, and the benzene solution water washed and evaporated. A viscous oily product resulted.

Example IV

To 20 g. of chlorinated pinene (23% $Cl_2$) was added 20 cc. of aqueous $NH_4SH$ solution containing 7.0 g. of $NH_4SH$. To this was added 100 cc. of alcohol and 25 cc. of benzene. This mixture was refluxed for about 3½ hours. It was then washed with water until free of the ammonium hydrosulphide solution. The reaction mixture was then freed of water and the product recovered by the evaporation of benzene. The product gave a positive mercaptan test and analyzed 4.7% sulphur.

Example V 20 cc. of chlorinated pinene was mixed with 1.5 g. of anhydrous aluminum chloride. Hydrogen sulphide was then passed through this mixture for about one hour, while the mixture was cooled by the immersion of the container in ice water. The container was then closed and slowly warmed to a temperature of 65° C., and maintained at this temperature for two hours. The mixture was then cooled and the aluminum chloride filtered out. The reaction mixture was then washed several times with water and dried. No hydrogen sulphide remained as shown by test. The final product gave a positive test for mercaptan and analyzed 0.44% sulphur.

Example VI 50 cc. of alcoholic potassium pinene mercaptide was prepared by reacting 15 cc. of caustic extracted pinene mercaptan (14% S) with the theoretical amount of KOH in alcohol. To this was added 4 g. of chlorinated pinene (23% $Cl_2$) and the mixture warmed on the steam bath for about two hours. A white precipitate of KCl was filtered out and the reaction mixture then washed with alcohol. Most of the alcohol was then evaporated from the reaction mass, which was then dissolved in ether. This solution was then washed several times with dilute caustic to remove any mercaptan. The reaction product was then recovered in the form of a viscous oil which analyzed 11.70% sulphur.

Example VII 10 cc. of chlorinated pinene (23% $Cl_2$), 10 cc. of ethyl mercaptan and 2 g. of anhydrous aluminum chloride were well mixed and allowed to stand for two hours. The reaction mass was washed with water dilute hydrochloric acid and then with water. It was then freed of water by a drying agent and the ethyl mercaptan removed by evaporation. The reaction product gave a negative test for mercaptan, but a positive test for sulphur.

It will be understood that the details and examples hereinbefore set forth are illustrative only, and do not in any way limit the invention as herein broadly described and claimed.

What I claim and desire to protect by Letters Patent is:

1. The method of producing a sulphur-containing terpene product which includes reacting a halogenated terpene compound with a compound containing the group $-S_nM$, where M is a metal, the ammonium group or hydrogen and $n$ is 1 or more.

2. The method of producing a sulphur-containing terpene product which includes reacting a halogenated terpene compound with a compound containing the group $-S_nM$, where M is a metal and $n$ is 1 or more.

3. The method of producing a sulphur-containing terpene product which includes reacting a halogenated terpene compound with an inorganic compound containing the group $-S_nM$, where M is a metal, the ammonium group or hydrogen and $n$ is 1 or more.

4. The method of producing a sulphur-containing terpene product which includes reacting a halogenated terpene compound with an organic compound containing the group $-S_nM$, where M is a metal, the ammonium group or hydrogen and $n$ is 1 or more.

5. The method of producing a sulphur-containing terpene product which includes reacting a halogenated terpene compound with hydrogen sulfide.

6. The method of producing a sulphur-containing terpene product which includes reacting at a temperature of from about 60° C. to about 110° C. a halogenated terpene compound with a compound containing the group -$S_nM$, where M is a metal, the ammonium group or hydrogen and $n$ is 1 or more.

7. The method of producing a sulphur-containing terpene product which includes reacting a halogenated terpene hydrocarbon with a compound containing the group -$S_nM$, where M is a metal, the ammonium group or hydrogen and $n$ is 1 or more.

8. The method of producing a sulphur-containing terpene product which includes reacting a halogenated terpene alcohol with a compound containing the group -$S_nM$, where M is a metal, the ammonium group or hydrogen and $n$ is 1 or more.

9. The method of producing a sulphur-containing terpene product which includes reacting a halogenated terpene ketone with a compound containing the group -$S_nM$, where M is a metal, the ammonium group or hydrogen and $n$ is 1 or more.

10. The method of producing a sulphur-containing terpene product which includes simultaneously reacting a terpene compound with a halogen and hydrogen sulphide.

11. The method of producing a sulphur-containing terpene product which includes reacting a halogenated terpene compound with a compound containing the group -$S_nM$, where M is a metal, the ammonium group or hydrogen and $n$ is 1 or more, and separating the sulphur-containing terpene product from the reaction mixture.

12. The method of producing a sulphur-containing terpene product with includes reacting a halogenated terpene compound with a compound containing the group -$S_nM$, where M is a metal, the ammonium group or hydrogen and $n$ is 1 or more, and extracting the sulphur-containing terpene product from the reaction mixture with a solvent therefor.

13. The method of producing a sulphur-containing terpene product which includes reacting a halogenated terpene compound with an inorganic sulphide.

14. The method of producing a sulphur-containing terpene product which includes reacting a halogenated terpene compound with an alkali metal mono-sulphide.

15. The method of producing a sulphur-containing terpene product which includes reacting a halogenated terpene compound with sodium sulphide.

16. The method of producing a sulphur-containing terpene product which includes reacting a halogenated terpene compound with a metal thiocyanate.

17. The method of producing a sulphur-containing terpene product which includes reacting a halogenated terpene compound with sodium thiocyanate.

EMIL OTT.